United States Patent [19]
Alberts et al.

[11] 3,988,388
[45] Oct. 26, 1976

[54] POLYMERIZABLE ORGANIC DISPERSION OF UNSATURATED POLYESTER VINYL MONOMER AND EVA COPOLYMERS

[75] Inventors: Heinrich Alberts, Cologne; Hansjochen Schulz-Walz, Meerbusch; Herbert Bartl, Odenthal-Hahnenberg; Leonhard Goerden, Grefrath-II-Oedt; Klaus Schuster, Opladen, all of Germany

[73] Assignee: Bayer Aktiengesellschaft, Leverkusen, Germany

[22] Filed: Feb. 25, 1975

[21] Appl. No.: 552,860

[30] Foreign Application Priority Data
Mar. 2, 1974  Germany............................ 2410083
Oct. 17, 1974  Germany............................ 2449397

[52] U.S. Cl. ........................ 260/862; 260/28.5 AV; 260/40 R; 260/42.17; 260/45.7 R; 260/873
[51] Int. Cl.$^2$........................................ C08L 67/06
[58] Field of Search............ 260/862, 873, 33.6 UA, 260/33.6 PQ, 34.2, 29.1 R, 28.5 AV

[56] References Cited
UNITED STATES PATENTS

| | | | |
|---|---|---|---|
| 3,206,441 | 9/1965 | Von Bonin et al............. | 260/78.5 R |
| 3,331,796 | 7/1967 | Gilbert et al........................ | 260/862 |
| 3,642,683 | 2/1972 | Fry.................................... | 260/862 |
| 3,718,714 | 2/1973 | Comstock et al................... | 260/862 |
| 3,852,376 | 12/1974 | Bando et al......................... | 260/862 |

*Primary Examiner*—Murray Tillman
*Assistant Examiner*—Thurman K. Page
*Attorney, Agent, or Firm*—Connolly and Hutz

[57] ABSTRACT

Pourable and pumpable, storage-stable organic dispersions which can be cured with little shrinkage comprising unsaturated polyesters, copolymerizable vinyl monomers, ethylene vinyl ester copolymers and optionally dispersing agents.

3 Claims, No Drawings

POLYMERIZABLE ORGANIC DISPERSION OF UNSATURATED POLYESTER VINYL MONOMER AND EVA COPOLYMERS

The present application relates to moulding materials which can be cured with little shrinkage and are based on unsaturated polyesters, copolymerisable monomers and ethylene/vinyl ester copolymers.

Conventional hot-curable polyester resins show considerable shrinkage on polymerisation, and this is a severe disadvantage in the production of mouldings having a perfect surface. Now it is known from numerous publications (for example German Offenlegungsschriften (German Published Specifications) Nos. 1,192,820, 1,694,857, 1,803,345, 1,953,062, 2,051,663 and 2,061,585 and French Patent Specification No. 1,148,285) that polyester moulding materials to which certain thermoplastics have been admixed before curing can be cured with little shrinkage. For example, homopolymers or copolymers of styrene, polyacrylates, polymethacrylates, cellulose esters and polyethylene have been proposed as thermoplastics suitable for this purpose. Whilst these additives reduce the shrinkage on polymerisation they are - with the exception of polyethylene - soluble in the polyester/monomer systems or can only be combined with these systems by forming an emulsion. Such resin compositions as a rule have an undesirably high viscosity which considerably interferes with the processability of the resins, for example with the incorporation of fillers, and makes the feeding and homogenisation of these resins time-consuming and technically unnecessarily complex.

Where the polyester resin/thermoplastic systems tend to demix, the components can only be combined shortly before being used to produce mats, since otherwise an inhomogeneous distribution in the resin mats result. Usually, part of the thermoplastic sweats out during the ripening of the mats, resulting in tacky surfaces of the mats and hence making it difficult to pull off the release films which are usually employed. Consequently, poor surface quality of the pressings, with matt patches, and the formation of deposits on the tool are produced as a result.

Most of the previously known polyester resins which can be cured with low shrinkage acquire an intense white colour during curing. This phenomenon causes a more or less pronounced lightening of the colour shade, depending on the thickness of the mouldings, so that uniform colouration of mouldings of varying thickness is not possible.

Even if polyethylene, which is insoluble in the polyester/monomer systems, is used as an additive to reduce shrinkage, inadequate compatibility of these resins with glass fibres, and poor surfaces and uneven colouration of the pressings are disadvantages which prevent successful use of such resin compositions (compare also German Patent Specification No. 1,241,983, column 1, lines 30–43).

German Patent Specification No. 1,241,983 has disclosed a process for the preparation of moulding materials of low shrinkage, which can be cured to give strain-free mouldings, have good compatibility with glass fibres, and are based on unsaturated polyesters and copolymerisable monomers containing 10–90% by weight of ethylene/vinyl acetate copolymers as a thermoplastic additive. As is stated in the description, copolymers containing 10–98% by weight of vinyl acetate can be employed if the mixing process is effected by melting; if the ethylene/vinyl acetate copolymers are to be employed to produce pasty mixtures, products containing more than 40% by weight of vinyl acetate should again be used; furthermore, copolymers containing more than 45% by weight of vinyl acetate are recommended for use in styrene solutions, to which solid polyesters or highly concentrated polyester solutions can then be added.

However, whilst copolymers containing more than approx. 60% by weight of vinyl acetate are soluble in the polyester/monomer systems and therefore cause the undesirably high viscosity already mentioned above, copolymers containing from approx. 25 on 30 to approx. 60% by weight of vinyl acetate, though soluble in copolymerisable monomers, coagulate on addition of the polyester, precipitate in the form of a gel and form a clearly visible sedimented phase so that they are unsuitable for the production of storage-stable systems.

Surprisingly, it has now been found that the addition of finely divided ethylene/vinyl ester copolymers containing 0.5–20% by weight of vinyl ester gives storage-stable polymersible dispersions which because of their low viscosity (which as a rule is less than 2,500 cP, measured according to DIN 53,015 at 25° C) can be fed without difficulties and can take up exceptionally high amounts of fillers. Such suspensions offer all the advantages of a one-component resin. Up to a proportion of 50% by weight of the ethylene/vinyl ester copolymer can advantageously be replaced by polyethylene. The dispersions according to the invention are particularly useful for meeting practical requirements, particularly, in forming perfect surfaces and uniform colouration of the mouldings.

According to the invention there are provided pourable and pumpable, storage-stable organic dispersions, which can be cured with little shrinkage, comprising 35–59% by weight of unsaturated polyesters, 40–64% by weight of copolymerisable vinyl monomers, 1–20% by weight of ethylene vinylester copolymers containing 0,5–20% by weight of vinyl ester and optionally up to 15% by weight of dispersing agents. The preferred ethylene/vinylester copolymers are ethylene/vinyl acetate copolymers or ethylene/vinyl propionate copolymers. Up to 50% by weight of the ethylene/vinylester copolymers may be replaced by polyethylene.

The dispersion is suitably produced by distribution by means of a simple stirring unit. Because of the low shear forces required, a rise in temperature in the dispersion system is avoided; the suspension obtained is sufficiently stable on storage but can be improved yet further by use of dispersing agents. The copolymers or the polyethylene are preferably admixed in a finely divided pulverulent form; however, any other form of addition is also possible.

The unsaturated polyesters used in the dispersion according to the invention are prepared according to known processes by polycondensation of at least one $\alpha,\beta$-ethylenically unsaturated dicarboxylic acid or one of its ester-forming derivatives, optionally mixed with up to 90 mol %, based on the unsaturated acid component, of at least one saturated dicarboxylic acid or one of its ester-forming derivatives, with at least one dihydric alcohol. Example of unsaturated dicarboxylic acids or their derivatives, to be used preferentially, are maleic acid or maleic anhydride and fumaric acid. However it is also possible to use, for example, mesaconic acid, citraconic acid, itaconic acid or chloromaleic acid. Examples of the saturated dicarboxylic acids, or their derivatives, which are used are phthalic acid or phthalic anhydride, isophthalic acid, terephthalic acid, hexahydrophthalic acid or tetrahydrophthalic acid or their anhydrides, endomethylenetetrahydrophthalic acid or its anhydride, succinic acid or succinic anhydride and succinic acid esters and chlorides, adipic acid and sebacic acid. In order to produce resins of low inflammability, it is possible to use, for example, hexachloroendomethylenetetrahydrophthalic acid (Het-acid), tetrachlorophthalic acid or tetrabromophthalic acid. Flame resistance can also be achieved by addition of compounds which contain halogen but are not co-condensed into the polyester, such as, for example, chloroparaffin. Polyesters to be used preferentially contain maleic acid radicals, of which up to 25 mol% can be replaced by phthalic acid- or isophthalic acid radicals. Dihydric alcohols which can be used are ethylene glycol, 1,2-propanediol, 1,3-propanediol, diethylene glycol, dipropylene glycol, 1,3-butanediol, 1,4-butanediol, neopentyl glycol, 1,6-hexanediol, perhydrobisphenol and others. Ethylene glycol, 1,2-propanediol, diethylene glycol and dipropylene glycol are used preferentially. The polyesters to be used preferentially must contain a high proportion of polymerisable double bonds since the materials according to the invention are moulded, and released from the mould, at high temperatures (140°–160° C) and must therefore have a correspondingly high heat distortion point.

The acid numbers of the polyesters used should be between 1 and 50, preferably between 5 and 25, the OH numbers should be between 10 and 100, preferably between 20 and 50, and the molecular weights should be between 500 and 10,000, preferably between 700 and 3,000 (measured by vapour pressure osmosis in dioxane and acetone; if both values differ from one another the lower value is considered to be the correcter one).

Suitable copolymerisable vinyl monomers in the sense of the invention are the unsaturated compounds customary in polyester technology, which preferably carry α-substituted vinyl groups or β-substituted allyl groups, preferably styrene, but also, for example, nuclear-chlorinated and nuclear-alkylated styrenes, wherein the alkyl groups can contain 1–4 carbon atoms, such as, for example, vinyl toluene, divinyl benzene, α-methylstyrene, tert.-butylstyrene and chlorostyrenes, vinyl esters of carboxylic acids with 2–6 carbon atoms, preferably vinyl acetate, vinylpyridine, vinylnaphthalene, vinylcyclohexane, acrylic acid and methacrylic acid and/or their esters with 1–4 carbon atoms in the alcohol component, their amides and their nitriles, maleic anhydride, maleic acid half-esters and diesters with 1–4 carbon atoms in the alcohol component, maleic acid half-amides and diamides or cyclic imides such as N-methylmaleimide or N-cyclohexylmaleimide, allyl compounds such as allylbenzene and allyl esters such as allyl acetate, allyl acrylate, allyl methacrylate, phthalic acid diallyl ester, isophthalic acid diallyl ester, fumaric acid diallyl ester, allyl carbonate, diallyl carbonate, triallyl phosphate and triallyl cyanurate.

The ethylene polymers which can be used for the dispersing process according to the invention are prepared in accordance with known tubular reactor processes or stirred reactor processes. They are ethylene homopolymers or ethylene copolymers which contain vinyl propionate or, preferably, vinyl acetate in amounts of 0.5–20% by weight, preferably of 7–15% by weight, and in special cases of 8–10% by weight, in the form of copolymerised units.

The melt indices measured according to DIN 53,735 at 190° C and 2.16 kp load, of the shrinkage-reducing additives range from zero flow up to 1,000; preferably, polyethylene grades with melt indices between 0.1 and 20 are used.

Of course, not only high pressure polyethylenes can be used for the dispersion according to the invention, but also polyethylene grades produced by low pressure or medium pressure processes, as well as homopolyethylenes or ethylenes/vinyl ester copolymers produced by special processes.

The addition of dispersing agents has a favourable influence on the stability of the dispersions.

Particularly effective dispersing agents are high molecular polymers which are soluble in copolymerisable monomers or in unsaturated polyesters or in a polyester/monomer mixture. Very particularly preferred dispersing agents are ethylene/vinyl acetate copolymers which preferably contain 60 to 99% by weight, and in special cases 65–75% by weight, of vinyl acetate and have a Mooney viscosity of at least 15, preferably of 40 to 65, Mooney, measured according to DIN 53,523 (L-4), and also polyvinyl acetates.

However, further suitable dispersing agents are polyacrylic or polymethacrylic acid ester homopolymers and copolymers which contain 1 to 24 C atoms in the alcohol component, such as, for example, polyacrylic acid decyl ester, or copolymers of ethylene containing up to 60% by weight of ethylene, with acrylic or methacrylic acid esters which contain 1 to 24 C atoms in the alcohol component, or with vinyl esters of organic monocarboxylic acids or dicarboxylic acids with 1 to 19 C atoms, or with their saponification products. Graft polymers, with the abovementioned polymers as the graft substrate, are also very good dispersing agents.

Further suitable dispersing agents are polyethers, such as polyethylene oxide, polypropylene oxide and copolymers of these two compounds, ethoxylated saturated and unsaturated fatty acids with 4 to 30, preferably with 6 to 19, C atoms, their esters which contain 1 to 24 C atoms in the alcohol component, their amides and nitriles, fatty alcohols with 1 to 30, preferably with 4 to 16, C atoms, or graft polymers in which the above polymers are the graft substrate, such as are described, for example, in German Auslegeschrift (German Published Specification) No. 1,137,554.

Suitable graft monomers are vinyl-aromatics, such as vinyl toluene, α-methylstyrene, tert.-butylstyrene and chlorostyrenes, but preferably unsubstituted styrene itself, and vinyl acetate, acrylic acid and methacrylic acid, their nitriles and esters of which the alcohol component can contain 1–18 C atoms, such as, for example, methyl methacrylate or ethyl acrylate, acrylonitrile or methacrylonitrile, maleic anhydride and maleic acid half-esters and diesters with 1–30, preferably 4 to 16, C atoms in the alcohol component. Of course, mixtures of the listed graft substrates and graft monomers can also be used.

Further suitable dispersing agents are cellulose derivatives, such as methylcellulose, ethylhydroxycellulose or cellulose esters, for example cellulose acetate, cellulose acetopropionate, cellulose acetobutyrate or nitrocellulose.

Sometimes, the introduction of water, which can, for example, be dissolved in the dispersing agent, cannot be avoided entirely when preparing the dispersion. Frequently, however, this is not a disadvantage; on the contrary, often small amounts of water are added deliberately since the stability of the dispersion can be improved by this measure. The finished synthetic resin system may contain up to 5% by weight of water; as a rule, however, the water content is less than 1% by weight.

The dispersing agents are added in a concentration of 0.001 to 20% by weight, preferably of 0.5–3% by weight, based on the finished dispersion.

To prevent undesired premature polymerisation of the polymerisable dispersion it is advisable to add 0.001–0.1% by weight of polymerisation inhibitors or antioxidants to the dispersion already during its preparation. Suitable auxiliaries of this type are, for example, phenols and phenol derivatives, preferably sterically hindered phenols, which contain alkyl substituents with 1–6 C atoms in both o-positions relative to the phenolic hydroxyl group, amines, preferably secondary acrylamines and their derivatives, quinones, copper salts of organic acids and addition compounds of copper(I) halides with phosphites, such as, for example, 4,4'-bis-(2,6-di-tert.-butylphenol), 1,3,5-trimethyl-2,4,6-tris-(3,5-di-tert.-butyl-4-hydroxy-benzyl)-benzene, 4,4'-butylidene-bis-(6-tert.-butyl-m-cresol), 3,5-di-tert.-butyl-4-hydroxy-benzyl-phosphonic acid diethyl ester, N,N'-bis-($\beta$-napthyl)-p-phenylenediamine, N,N'-bis-(1-methylheptyl)-p-phenylene-diamine, phenyl-$\beta$-naphthylamine, 4,4'-bis-($\alpha,\alpha$-dimethylbenzyl)-diphenylamine, 1,3,5-tris-(3,5-di-tert.-butyl--4-hydroxy-hydrocinnamoyl)-hexahydro-s-triazine, hydroquinone, p-benzoquinone, toluhydroquinone, p-tert.-butylpyrocatechol, chloranil, naphthoquinone, copper naphthenate, copper octoate, Cu(I)Cl/triphenyl phosphite, Cu(I)Cl/trimethyl phosphite, Cu(I)Cl/tris-chloroethyl phosphite, Cu(I)Cl/tripropyl phosphite and p-nitrosodimethylaniline. Further suitable stabilisers are described in "Methoden der organischen Chemie" ("Methods of Organic Chemistry") (Houben-Weyl), 4th edition, volume XIV/1, pages 433–452 and 756, Georg Thieme Verlag, Stuttgart, 1961. For example, p-benzoquinone used at a concentration of 0.01 to 0.05% by weight, relative to the finished dispersion, is very suitable.

The ethylene/vinyl ester copolymers used according to the invention have the particularly advantageous property that they are insoluble in the copolymerisable vinyl monomers, for example styrene, at room temperature and that finely divided, homogeneous dispersions of these copolymers in the polyester/monomer systems have a very low viscosity. Furthermore, mouldings produced from these dispersions using the customary additives have excellent gloss and very good shrinkage values and outstandingly uniform colour distribution.

Sufficiently finely divided powders of the ethylene/vinyl ester copolymers can be obtained either by suitable polymerisation processes (after working up from the emulsion by spray drying or from the suspension by flow drying) or by suitable dispersing processes in which, for example, a solid copolymer is dissolved and distributed in a non-solvent or an aqueous dispersing agent solution with rapid stirring, or in which, at far higher temperatures, a melt of the copolymer is distributed in an aqueous dispersing agent solution under the action of high shear forces. In spite of being manufactured in different ways, the powders have comparable properties as shrinkage-reducing additives. Hence, the powders can be chosen from the point of view of economics.

The dried powders can, as already described, be distributed homogeneously in a polyester/monomer mixture by stirring. Such a suspension of solids has exceptional advantages from the point of view of processing, since it has viscosities of less than 2,500 cP, in part less than 1,000 cP, measured according to DIN 53,015 at 25° C, and allows large amounts of fillers to be incorporated into the dispersion. The prerequisite is that fine thermoplastic powders of very small particle size should be used. The particle size is in general adequate for the field of use if the diameter of the non-agglomerated particles is less than 30 $\mu$, preferably less than 10 $\mu$. If the requisite particle size distribution is not achieved, the suspension in the polyester/monomer system is inadequately storage-stable since the thermoplastic powder creams up.

However it is possible, without difficulty, to produce pourable stable dispersions of ethylene polymers in systems which contain unsaturated polyesters and copolymerisable vinyl monomers by combining the two solutions, of ethylene polymers and of unsaturated polyesters in monomers, in the presence of dispersing agents at 50°–120° C in a zone of high turbulence, withdrawing the resulting mixture from this zone and keeping it at 50°–120° C with intensive stirring, until a pourable state of low viscosity has resulted.

For carrying out the process, it is advantageous to effect the combination of the two solutions in a zone of high turbulence with simultaneous exposure to shear forces. In contrast, during the subsequent stirring at an elevated temperature, shear forces and cavitation forces must not be present, or must be of negligible magnitude only.

A zone of high turbulence as herein used denotes a space where intensive mixing takes place and through which at least 300 parts by volume of liquid pass per hour and per part by volume of the space. Turbulence zones in which the volume of liquid passing per hour and per part by volume of the turbulence zone is 1,200 to 5,400 parts by volume, that is to say in which the residence time of the mixture in the turbulence zone is between approx. 6 seconds and less than 1 second, are preferred.

In general, known devices, for example conventional stirred kettles or, preferably, pumps equipped with rotors are used to produce a zone of high turbulence.

The specific mixing energy in an intensively stirred kettle is as a rule $10^{-1}$ to $10^{-3}$ Watt/cm$^3$. It is higher immediately in the stirring vortex and suffices for forming dispersions with ethylene polymer contents of up to 25% by weight. For example, it is possible to employ a stirred kettle with a disc stirrer and flow breakers, in which the ratio of kettle diameter:stirring diameter should be between 1 : 0.9 and 1 : 0.2. When using such a stirred kettle, a separate feed, which is advisable, can be achieved by introducing one component (the polyester/monomer solution) directly into the stirring vortex and the other component (ethylene polymer/monomer solution) into the hollow shaft of the stirrer, so that both components are first mixed intensively and the monomer content of the gel is only lowered subsequently in a second step at a lower stirring intensity and increased temperature.

Pumps equipped with rotors are considerably more suitable than conventional stirred kettles, above all because in these pumps the residence time in the zone of high turbulence is sharply limited. A special model specifically developed for high turbulence, the so-called centrifugal homogenising machines, are suitable for particularly high throughput; their specific mixing energy is about 5–25 Watt/cm$^3$. They thus permit particularly intensive mixing with a very short residence time and are therefore used preferentially.

To achieve a high stability of the suspension it is particularly advisable that the mixtures which leave the zone of high turbulence should be recirculated into the turbulence zone so that the continuously freshly added polyester and ethylene polymer solutions are combined with already premixed product in the zone of high turbulence. It is also possible to mix the polyester solution with the recirculating mixture before entry into the turbulence zone and to introduce the ethylene polymer solution in the turbulence zone. It is also possible to divide one stream, for example the stream of the ethylene polymers, into several component streams and to introduce these at different points of the turbulence zone. In order to run with extremely high product throughputs, it is also possible to arrange several turbulence zones in series.

The solids contents of the dispersions according to the invention are between 1 and 35% by weight, preferably between 5 and 25% by weight and in special cases between 11 and 17% by weight. The solids content denotes the content of ethylene polymer and dispersing agent in % by weight. The ethylene polymer is almost always dissolved in the copolymerisable monomer at an elevated temperature. The dispersing agent or the chosen dispersing agent combinations is or are in general also dissolved in the monomer together with the ethylene polymer, but can also be dissolved in the polyester or the polyester-monomer solution or be subsequently introduced into the finished dispersion. The concentrations of the two solutions to be combined, of polyester on the one hand and ethylene polymer on the other, should be so chosen that the solutions are pourable and pumpable at the chosen working temperature. Admittedly it would also be possible in principle to mix, for example, the undiluted polyester with an ethylene polymer/monomer solution in the manner described; naturally, the polyester would then however have to be heated to a temperature of about 140°–160° C to be readily pumpable. Since, however, the ethylene polymer solution must also in general be warmed to at least 70° C to give a perfect solution, too high a mixing temperature would result on combining the streams of material and hence the solubility of the ethylene polymer in the system would be undesirably high, so that such a procedure does not prove successful.

The temperature when bringing the two solutions together is so chosen that a gel is first produced during the spontaneously occurring precipitation of the ethylene polymer whilst the migration of the monomer from this gel into the polyester/monomer phase during stirring takes place as rapidly as possible.

The preferred temperature is between 60° C and 90° C. The end of the dispersing process is recognisable from the fact that the viscosity of the stirred system and at the same time the structural-viscosity properties, that is to say the non-Newtonian behaviour, decline. When the viscosity no longer changes, the process can be discontinued and the resulting dispersions of ethylene polymers in the polyester/monomer systems are stable.

The polymerisable dispersion according to the invention is processed in accordance with customary methods, by moulding and polymerisation, using pressure and heat. The polymerisation initiators used are radical-forming agents, preferably organic peroxides. For example, when using the hot pressing process, one or more layers of glass fibre mat or glass fibre fabric or a glass fibre preform is or are introduced into a heated steel mould, the liquid dispersion mixed with the peroxide is poured on top of the glass structure, and the mould is then closed by means of a press, resulting in moulding and polymerisation. The dispersion can also be further processed by means of the profile-drawing process, wherein slivers of glass fibres are impregnated with the liquid dispersion to which peroxide has been added and are then drawn through a die in which moulding and curing are effected. Of course, adjuvants such as, for example, fillers and/or pigments, can be added.

The resin mats or compression moulding materials produced from the dispersion according to the invention are as a rule moulded at temperatures between 120° C and 180° C and pressures between 30 and 150 kp/cm$^2$. However, they can also be processed by the injection moulding process on conventional injection moulding machinery.

The mouldings produced from the dispersion according to the invention have a smooth, flawless surface of exceptionally high surface gloss. A particular advantage is the fact that in contrast to customary resins which can be cured with low shrinkage, the mouldings can be coloured homogeneously. Since the whitening effect which occurs when curing customary resins which can be cured with low shrinkage does not occur here (compare German Offenlegungsschrift (German Published Specification) No. 1,694,857), it is also possible to prepare mouldings of dark colour without the colour shade turning lighter or the otherwise customary marbling effect occurring. Even large sheet-like mouldings do not distort. Because of the high heat distortion point of the polyester resins, mouldings produced from the dispersion according to the invention can be lacquered by the processes customary in the automobile industry.

Because of the outstanding properties of the polymerisable dispersions according to the invention, mouldings produced from them can be used for diverse purposes. By way of example, their use in the automobile industry may be mentioned where, because of their low shrinkage and outstanding surface quality, it is now possible to prepare bodywork components without sink marks becoming visible on the outside, opposite the fixing lugs present on the inside. Furthermore it is a particular advantage for this field of application that the components are dimensionally stable and can be lacquered by a stoving process. Furthermore, for example, it is now possible, using the dispersion according to the invention, to prepare distortion-free and dimensionally accurate large lamp housings. The use of the dispersions according to the invention in the preparation of furniture is of particular interest. Here, the excellent surface quality and homogeneous colouration, even in the case of dark colour shades, provide advantages.

The percentages indicated in the text which follows are % by weight.

The polyester A used in the examples which follow is a condensation product of 31% by weight of 1,2-propanediol, 17% by weight of di-1,2-propanediol, 40% by weight of maleic anhydride and 12% by weight of phthalic anhydride, of acid number 30, which has been manufactured by heating to 210° C for 10 hours. The resulting polyester was dissolved in styrene, together with 0.02% by weight of hydroquinone, to give a 65% strength by weight solution having a dynamic viscosity of 1,500 cP, measured according to DIN 53,015 at 20° C (= polyester resin solution A).

The polyethylene B used was a medium pressure ethylene/vinyl acetate copolymer containing 9% by weight of vinyl acetate and having a melt index of 12.5, measured according to DIN 53,735, and the ehtylene/vinyl acetate copolymer C used was a high pressure polyethylene having a vinyl acetate content of 8.5% by weight and a melt index of 5.1, measured according to DIN 53,735.

"Paraplex P 340" is an unsaturated polyester resin from Messrs. Rohm & Haas, Philadelphia, which contains maleic acid units and propylene glycol units (65% strength solution in styrene). Acid number 20; OH number; 34; viscosity of the 65% strength solution in styrene: approx. 1,000 cP, measured according to DIN 53,015 at 25° C.

"Paraplex 681" is a polymethyl methacrylate (30% strength solution in styrene) of Messrs. Rohm & Haas, Philadelphia. Acid number: 7.

A mixture of 60% of "Paraplex P 340" and 40% of "Paraplex P 681" is designated "Paraplex P 19 C".

"Paraplex P 713" is a slightly modified polystyrene (30% strength solution in styrene) of Messrs. Rohm and Haas, Philadelphia.

A mixture of 60% of "Paraplex P 340" and 40% of "Paraplex P 713" is designated "Paraplex P 19 P".

Product 4270 of Messrs. Glidden is an unsaturated polyester resin (73% strength solution in styrene), which contains 0.8 mol of propanediol units and 0.2 mol of dipropylene glycol units per mol of maleic acid units. Acid number: 30; OH number: 46.

Product 7105 of Messrs. Glidden is a slightly modified polystyrene (25% strength solution in styrene).

1ST EXAMPLE (Comparison Experiment)

A resin mat of dark brown colour (colour shade: RAL 8015) was prepared from an unsaturated polyester resin in accordance with the following recipe: 100 parts by weight of polyester resin solution A, 100 parts by weight of filler (calcium carbonate, Durcal 5, a commercially available product from Messrs. Omya), 4 parts by weight of zinc stearate, 0.75 part by weight of 95% strength tert.-butyl perbenzoate, 3.35 parts by weight of Bayer 130 B red iron oxide, 1.65 parts by weight of Bayer F 318 black iron oxide and 1.5 parts by weight of magnesium oxide (Marmag, a commercially available product from Messrs. Merck).

A glass fibre mat (Vetrotex M 612) was impregnated with the mix. The resulting resin mat had a glass content of 26–28%. The resin mat was matured for 7 days at 25° C. After this time it has a dry surface; the polyethylene film could be pulled off easily.

2ND EXAMPLE (Comparison Experiment)

A resin mat of dark brown colour was prepared in accordance with Example 1, from a commercially available polyester resin which can be cured with little shrinkage. Instead of 100 parts by weight of polyester resin solution A, 100 parts by weight of a mixture (= Paraplex P 19 C) of 60% of Paraplex P 340 and 40% of Paraplex P 681 were used. The two components were mixed beforehand by means of a high speed stirrer and therefore had to be processed very rapidly thereafter since the emulsion formed started to demix after only approx. 10 minutes. After ripening for 8 days, the resin mat had a dry surface; the polyethylene film could be pulled off easily.

3RD EXAMPLE (Comparison Experiment)

A resin mat of dark brown colour was prepared in accordance with Example 1 from a commercially available polyester resin which can be cured with little shrinkage. Instead of 100 parts by weight of polyester resin solution A, a mixture (= Paraplex 719 P) of 60 parts by weight of Paraplex P 340 and 40 parts by weight of Paraplex P 713 was used. The mixture prepared from the two components with the aid of a high speed stirrer had to be processed very rapidly since it started to demix after only approx. 15 minutes. After ripening for 7 days, the resin mat had a tacky surface. The polyethylene film was very difficult to pull off, easily tore and produced thread-pulling.

4TH EXAMPLE (Comparison Experiment)

A dark brown resin mat was prepared in accordance with Example 1, using a commercially available polyester resin which can be cured with little shrinkage. Instead of polyester resin solution A, a mixture of 50 parts of 7105 and 50 parts by weight of 4270 (commercially available products from Messrs. Glidden) was employed. The emulsion prepared from the two components with the aid of a high speed stirrer was unstable and started to demix after approx. 30 minutes. The resin mat prepared therefrom had a tacky, thread-pulling surface after ripening for 7 days. The polyethylene film was very difficult to pull off and easily tore.

5TH EXAMPLE

A polyester resin which can be cured with very little shrinkage was prepared in accordance with the following recipe: 60 parts by weight of polyester resin solution A, 28 parts by weight of styrene, 12 parts by weight of polyethylene powder B and 0.03 part by weight of hydroquinone. A polyethylene powder which had been obtained by spray drying a polyethylene latex was used. The powder had a particle size diameter of 5–40 micrometers. The melt index of the polyethylene B was 1.2, measured according to DIN 53,735. The polyethylene powder B was mixed with the polyester resin solution A and the styrene by stirring for 15 minutes, using a simple paddle stirrer. The resulting dispersion was storage-stable for at least 10 days. A resin mat of dark brown colour was prepared therefrom in accordance with Example 1, using 100 parts by weight of the abovementioned mixture instead of 100 parts by weight of polyester resin solution A. After ripening for 7 days, the resin mat had an absolutely dry, non-tacky surface. The polyethylene film could be pulled off extremely easily.

6TH EXAMPLE

A resin which can be cured with little shrinkage and which contained polyethylene powder B as a shrinkage-reducing additive, was prepared according to Example 5. The powder had a particle diameter of between 2 and 20 micrometres. The resulting dispersion was storage-stable for at least 10 days. A resin mat, which contained 100 parts by weight of the mixture described above instead of polyester resin solution A and was dark brown in colour was prepared therefrom in accordance with Example 1. After ripening for 7 days, the resin mat had an absolutely dry, non-tacky surface. The polyethylene film could be pulled off extremely easily.

7TH EXAMPLE

Aa polyethylene dispersion was prepared in accordance with the following recipe: 60 parts by weight of polyester resin solution A, 28 parts by weight of styrene, 12 parts by weight of ethylene/vinyl acetate copolymer C and 0.01 part by weight of p-benzoquinone.

The copolymer C was incorporated into the unsaturated polyester in accordance with the process described on pages 12/13. An opaque dispersion of viscosity 450 cP, measured according to DIN 53,015 at 25° C, was produced. The dispersion was storage-stable for at least 15 days without creaming up or demixing. A resin mat was prepared from the dispersion, in accordance with Example 1 but employing 100 parts by weight of the dispersion described above instead of polyester resin solution A. After ripening for 7 days, the resin mat had an absolutely dry, non-tacky surface and the polyethylene film could be pulled off very easily.

8TH EXAMPLE

Tablets and sheets having a rip and a projecting piece were produced from the resin mats prepared according to Example 1–7, in metal moulds at a press temperature of 140° C. For the tablets, the press pressure was 30 km/cm² and for the sheets it was 150 kp/cm².

Assessment

The pressings produced from the resin mat according to Example 1 showed a rough matt surface which exhibited a pronounced glass fibre structure, ridging due to material sliding, and flow lines. On the smooth side of the sheet, deep sink marks were detectable. The tablets were severely distorted. The colouration was a homogeneous dark brown. The linear shrinkage was 0.28%.

The pressings produced from the resin mat according to Example 2 had a relatively smooth satin-gloss surface, which however was spoilt by the pronounced glass fibre structure. On the smooth side of sheet, slight sink marks were visible. The colouration was absolutely inhomogeneous and marbled, with light and dark patches. Even in the darkest patches the colour was far lighter than for the pressings produced from the resin mat according to Example 1. The linear shrinkage was 0.15%.

The pressings produced from the resin mat according to Example 3 had an almost perfect, glossy and smooth surface with only a slight glass fibre structure, and only broken by a few slight shrinkage spots. Only slight sink marks were detectable on the sheet. The colouration was almost homogeneous, slightly cloudy but distinctly lightened compared to the pressings obtained from the resin mat according to Example 1. The linear shrinkage was 0.09%.

The pressings produced from the resin mat according to Example 4 showed a smooth, glossy surface with a glass fibre structure, which however was broken by large, blurred matt blotches. Where blotches occurred on the pressings, a coating was left on the compression mould, which built up progressively more on repeated pressing operations.

The sheet showed distinct sink marks on the smooth side. The linear shrinkage was 0.19%.

The pressings obtained from the resin mat according to Example 5 showed a perfect surface which showed no sink marks even in the areas of the sheet where the material was thick.

The extremely high gloss was striking. The colouration was homogeneous and the depth of colour corresponding to that of the pressings produced from the resin mat according to Example 1. There was no coating on either the pressings or on the compression mould. The shrinkage was 0.025%.

The pressings produced from the resin mat according to Example 6 and 7 had the same very glossy surface as the pressings produced from the resin mat according to Example 5. They also showed an extremely high surface gloss and no sink marks in areas where the material was thicker. They were equally homogeneous and deep dark brown in colour. The linear shrinkage was 0% in the case of the pressings according to Example 6 and 0.015% in the case of the pressings according to Example 7.

We claim:

1. A pourable and pumpable, storage-stable dispersion which can be cured with minimal shrinkage comprising 35–59% by weight of an unsaturated polyester, 40–64% by weight of a copolymerizable vinyl monomer, 1–20% by weight of a low shrinkage thermoplastic copolymer selected from the group consisting of ethylene/vinyl acetate copolymer, ethylene/vinyl propionate copolymer and mixtures thereof, each said copolymer containing 0.5–20% by weight of vinyl ester and said copolymer having up to 50% by weight thereof replaced by polyethylene, and 0.001–20% by weight of a dispersing agent which is an ethylene/vinyl acetate copolymer containing 60–99% by weight of vinyl acetate and having a Mooney viscosity of at least 15.

2. A process for preparing a dispersion of claim 1 which comprises warming a solution of the unsaturated polyester in copolymerizable vinyl monomer and a solution of the low shrinkage thermoplastic copolymer to 50°–120° C., combining said warm solutions in the presence of said dispersing agent in a zone of high turbulence, withdrawing resulting mixture from said zone and stirring withdrawn mixture intensely at 50°–120° C. until a pourable state of low viscosity results.

3. A compression moulding material, injection moulding material or a resin mat prepared from a dispersion of claim 1.

* * * * *